Jan. 30, 1940.  H. LADERER  2,188,643
FILTER
Filed Jan. 2, 1936  2 Sheets-Sheet 2

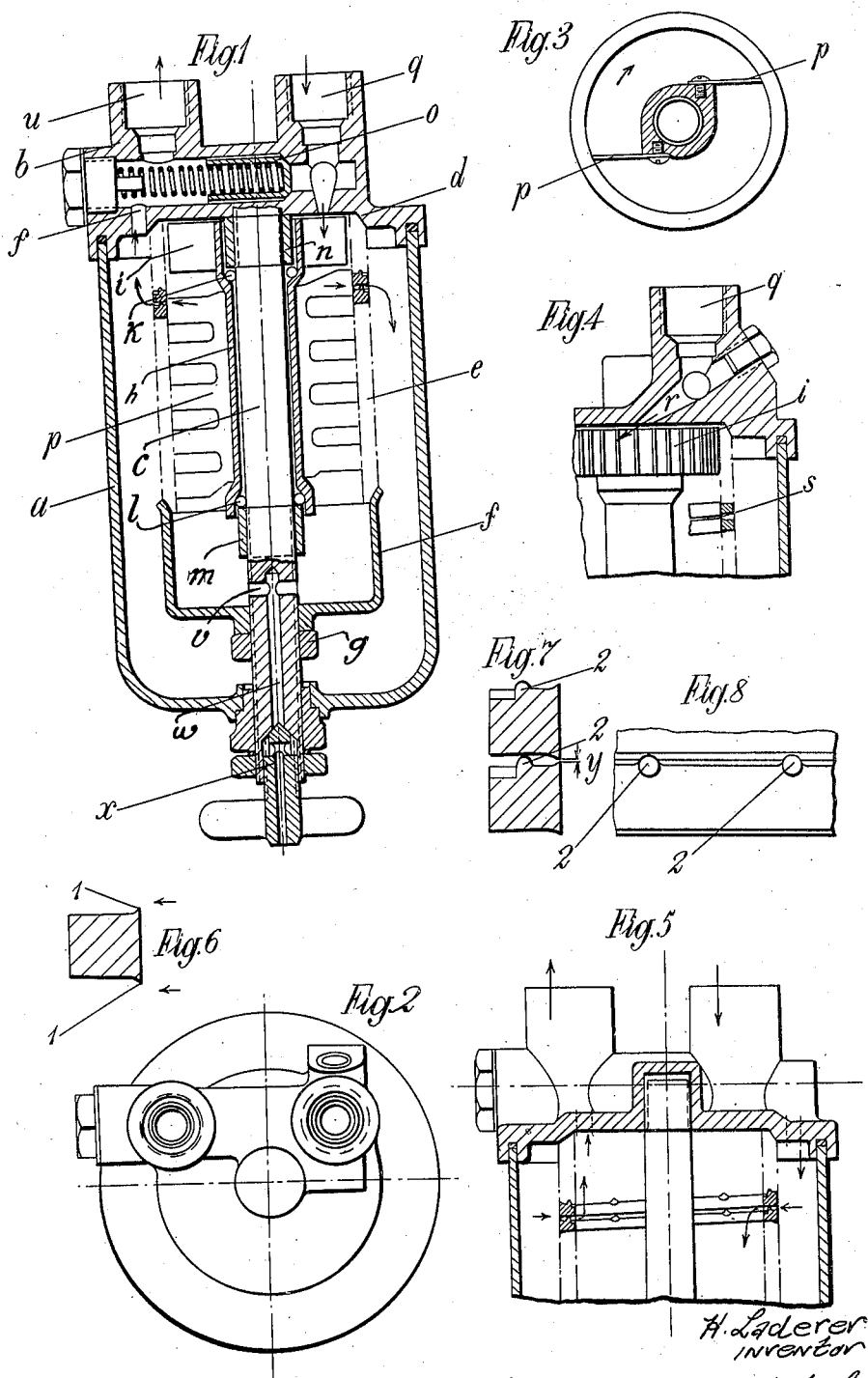

H. Laderer
INVENTOR

By: Glascock Downing & Seebold
Attys.

Patented Jan. 30, 1940

2,188,643

UNITED STATES PATENT OFFICE 2,188,643

FILTER

Hugo Laderer, Stuttgart-Bad Cannstatt, Germany

Application January 2, 1936, Serial No. 57,265
In Germany January 4, 1935

8 Claims. (Cl. 210—167)

This invention relates to filters, more particularly filters for purifying gaseous and liquid media, for instance for purifying fuels and gases for internal combustion engines, and for purifying oils which are used for lubricating machine parts.

Hitherto filters have been used for this purpose, which consist of separate superposed discs, and also sieves and strainers. For purifying air and gases, on the other hand, both dry centrifugal filters and also wet filters have been employed. None of these types of filters work satisfactorily. Some of them have the disadvantage that the filter cross-sections cannot be made sufficiently fine and consequently a relatively large percentage of foreign matter passes through the filter. Others again have the disadvantage, that they easily become stopped up and require frequent cleaning or that parts of the filter have to be soon replaced.

These discoveries underlie the problem, of which the present invention offers a solution. The invention relates to a novel kind of filter which differs fundamentally and in part as regards its construction from the known types.

The invention consists substantially in this that a helically wound wire of special cross-section is used. The profile is for instance a quadrangle, the edges of the inner sides of which are drawn up to form a fine chisel-like edge. These edges are in juxtaposition and can be very accurately adjusted to the degree of filtration. The medium to be purified flows against this edge. Behind the edges the cross-section recedes, so that between the convolutions there is a widening. This widening has the advantage that the filter has far less tendency to become stopped up than the known types. For instance, should foreign bodies pass through the filtering edge, they are flushed away owing to the widened gap. The filter helix according to the invention thus has the advantage that firstly, owing to its profile, it can be very accurately and finely adjusted and that secondly it does not tend to become stopped up.

Nevertheless, according to the invention cleaning means are provided, which, however, in contradistinction to the known forms, consists of a simple resilient comb-plate. According to the invention, for turning the brush or the comb-plate no special arrangement is provided, the comb-plate being mounted on a sleeve which is provided at its head with a simple blade wheel, against which the inflowing oil is guided at an angle. Owing to the oil being led at angle to the blades, it is not necessary for the blade wheel to be constructed as a turbine wheel and the blades may extend radially with respect to the axis of the sleeve. In order that it shall offer as little resistance as possible to rotating, the sleeve of the blade wheel and brush is mounted on two sets of balls, which run round directly on the internal spindle and on the inner surface of the sleeve.

The liquid filter which, as described above, consists of a helically wound wire can also be made of small straight bars which also have a rectangular or trapeziform cross-section which on one side is drawn up to form sharp edges, so that there is linear contact for instance between the edges. Filter bars of such a form can be adjusted with respect to one another with exactly the same accuracy as the helical convolutions. Suitably the small filter bars are strung at one end on a bar and are placed as a unit in the filter casing. For cleaning the filter the bars are removed and spread out fanwise, so that the foreign bodies can be removed in a simple manner by means of a brush.

It is also possible so to shape the wire which is wound to form a spring that in the extended state the inner width of the bar is smaller than the outer width. The difference is so selected that the stretching of the outer part of the wire caused in winding up the wire substantially corresponds to the compression of the inner part. By this means it is possible on the one hand to cause the sides of the convolutions to be parallel to one another and on the other hand, so to select the dimensions that the width of the outer edge will always be a definite percentage greater than the width of the inner edge, so that the linear fine adjustment for the filter, formed by the distances between the outer edges, is obtained. The dimensions may also be made such that towards the inside the distance apart of the surfaces widens uniformly.

In the accompanying drawings a constructional example of the invention is illustrated by 12 figures.

Fig. 1 shows a longitudinal section through a complete filter apparatus,

Fig. 2 shows a plan view,

Fig. 3 shows the brush in plan view,

Figure 9:
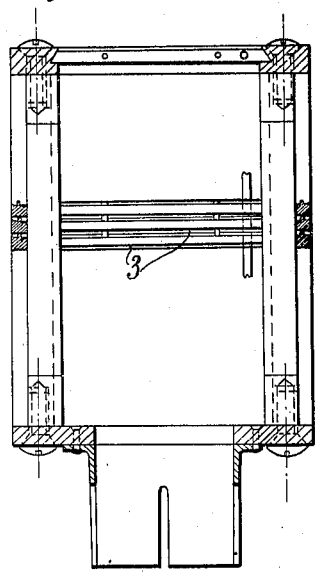
Figure 10:
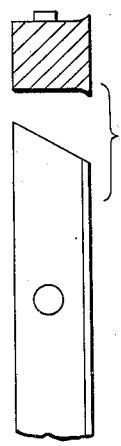
Figure 12:
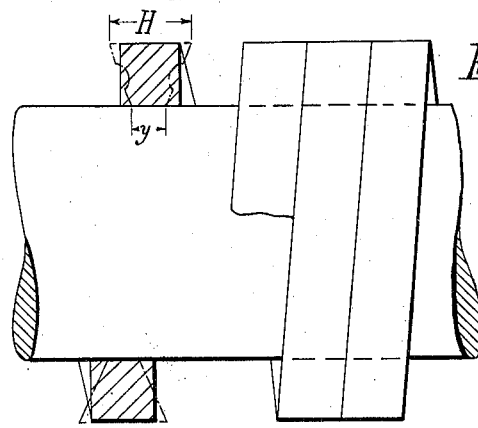
Figure 11:
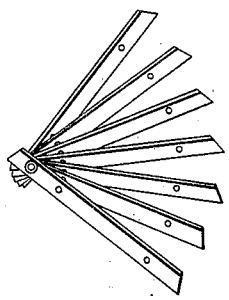

Fig. 4 shows a part section of the filter cover, which represents the passage for feeding the oil to the blade wheel, Fig. 5 is a part section of the apparatus, shown without the scraper, Fig. 6 shows to an enlarged scale the cross-section of the wire for the filter helix, Fig. 7 shows two superposed convolutions in cross-section, Fig. 8 shows in section a portion cut from some of the convolutions of a filter helix in elevation with the distancing protuberances for the separate convolutions, Fig. 9 is a longitudinal section through a filter with small bars used in place of the helical filter, Fig. 10 is a cross section through the bars and a corresponding plan view, Fig. 11 shows the strung-on superposed bars, illustrating how they may spread fanwise for cleaning, after being removed from the casing, Fig. 12 shows a further constructional example of a helical filter with the same cross section through the wire, which illustrates the trapezium shape in the extended state and the shape of the cross section in the wound state.

$a$ is the filter casing. It is closed by the cover $b$ into which the spindle $c$ is screwed. The cover is provided with a coned recess $d$. Against the latter bears the filter helix $e$, the top convolution of which is turned to correspond to the cone in the cover. The bottom end of the filter helix $e$ has a further cone which bears against a corresponding counter-cone of the mud pan $f$. The latter is also pushed on to the spindle $c$ and held in position by the nut $g$. On the spindle $c$ is also mounted the sleeve $h$ which is provided at its upper end with blades $i$. The blades are arranged radially around the sleeve. The sleeve $h$ is supported on the spindle $c$ by sets of balls $k$, $l$. The sets of balls bear against conical shoulders of the sleeve and are held in position by nuts $m$ and $n$. In the cover $b$ of the filter is a non-return valve $o$ which comes into operation, when for instance the filter becomes stopped up. The sleeve $h$ also carries a scraper $p$ consisting for instance of two oppositely disposed comb-plates. In the constructional example shown in Fig. 1 the oil to be purified is fed in through the branch $q$. The feed passage $r$ which forms a continuation of the opening $q$ opens to the blade wheel $i$ at an angle. The oil which is fed to the interior of the filter helix passes through the filter edges $s$ and flows purified into the outer space of the filter. From there the purified oil is conveyed through the passage $t$ and the branch $u$ to the place where it is to be used. The mud deposited within the filter helix is collected in the mud pan $f$ and may be drawn off through the outflow passages $v$, $w$ by removing the screw $x$.

The cross-sectional form illustrated in Figure 6 shows sharp drawn-out edges 1, 1. These edges which extend uninterruptedly along the bar which is to be wound to a helix rest against one another and enable a fine distance adjustment for the filter to be made, as shown at $y$ in Fig. 7. The filter distance is determined by the protuberances 2, 2 which are distributed uniformly or non-uniformly around the periphery of each convolution. These protuberances are produced when the bar is being rolled. Fig. 8 shows this protuberance in elevation.

The constructional example shown in Fig. 5 differs from that shown in Fig. 1 in this, that the medium to be cleaned is passed not from the inside outwards through the filter, but in the opposite direction. This in no way alters the effect of the filter.

The filter shown in the figures may be modified in any suitable way. For instance, instead of a helical filter flat filters may be used, the bars having the cross-section acording to the invention and the protuberances superposed. The filter constructed in this way may for instance be used for purifying the carburetter air and the like.

In Sheet II of the drawings such a filter is shown in Figs. 9 to 12. In Fig. 9 the filter bars 3, 3 are disposed on all four sides of the filter system. They may be secured in any suitable manner. For instance, as shown in Fig. 11, the bars are strung on rods, which has the advantage that the entire group of one side can be removed as a unit. Such an arrangement also facilitates cleaning, the bars being spread fanwise. The cross-section of the bars of Fig. 10 corresponds to the cross-section shown in Fig. 6 of the Sheet I of the drawings.

Filters of the kind described may, as already stated, be used for purifying liquid fuels of various kinds. They may also be constructed as exhaust filters, being built into the exhaust pipe in helical or prismatic form. In the exhaust pipe itself the filters act at the same time as silencers.

The filter may also with great advantage be used for purifying carburetter air and the combustion air of Diesel engines, especially for agricultural purposes and the like, and also in motor cars, stationary engines and in all cases where the air or gases to be used require purification. The filter is also suitable for purifying the lubricating oil of engines of all kinds, the filter being for instance disposed in the lubricating oil circuit of such engines and the oil being as it circulates purified continuously of the foreign bodies carried along with it.

The invention may also be carried out in such a manner that two or more filter helices are for instance arranged concentrically to one another, the medium to be purified being passed through on the opposed flow or the uniflow principle.

Suitably the filter helix is made of drawn or rolled aluminium wire. This provides the advantage, that, when purifying highly volatile fuels, such as petrol and the like, there can be no rusting of the filter helix. This is a great disadvantage of the filters hitherto used.

In Fig. 4 the turbine wheel 7 of the scraper $p\ p$ is driven by the inflowing oil. In place of the flowing oil a purely mechanical drive of any kind may, however, be provided. This manner of driving is also subject matter of the patent.

What I claim is:

1. A filter for liquids and gases, such as liquid or gaseous fuel, comprising a helix consisting of a bar of substantially rectangular cross-section with one side widened both above and below the upper and lower surfaces of the bar to form sharp edges, spacing projectings on the bar for holding the sharp edges of the convolutions a small distance apart, and means for supplying fluid and means for withdrawing same after it has been passed between the convolutions of the helix.

2. A filter for liquids and gases, such as liquid or gaseous fuel, comprising a helix consisting of a bar of substantially rectangular cross-section with one side widened to form sharp edges, spacing projections on the bar for holding the sharp edges of the convolutions a small distance apart, means for supplying fluid and means for withdrawing same after it has passed between the convolutions of the helix, a scraper for scraping the inner surface of the helix, a spindle for the scraper and means for rotating the scraper.

3. A filter for liquids and gases, such as liquid or gaseous fuel, comprising a helix consisting of a bar of substantially rectangular cross-section with one side widened to form sharp edges, spacing projections on the bar for holding the sharp edges of the convolutions a small distance apart, means for supplying fluid and means for withdrawing same after it has passed between the convolutions of the helix, a scraper for scraping the inner surface of the helix comprising two oppositely disposed combs, a spindle for the scraper and means for rotating the scraper.

4. A filter for liquids and gases, such as liquid or gaseous fuel, comprising a helix consisting of a bar of substantially rectangular cross-section with one side widened to form sharp edges, spacing projections on the bar for holding the sharp edges of the convolutions a small distance apart, means for supplying fluid and means for withdrawing same after it has passed between the convolutions of the helix, a scraper for scraping the inner surface of the helix, a spindle for the scraper and a blade wheel secured to the scraper and adapted to be rotated by the fluid flowing through the filter.

5. A filter for liquids and gases, such as liquid or gaseous fuel, comprising a helix consisting of a bar of substantially rectangular cross-section with one side widened to form sharp edges, spacing projections on the bar for holding the sharp edges of the convolutions a small distance apart, means for supplying fluid and means for withdrawing same after it has passed between the convolutions of the helix, a scraper for scraping the inner surface of the helix, a spindle for the scraper, a blade wheel secured to the scraper and adapted to be rotated by the fluid flowing through the filter and ball bearings on which the scraper and blade wheel run on the spindle.

6. A filter for liquids and gases, such as liquid or gaseous fuel, comprising a helix consisting of a bar of substantially rectangular cross-section with one side widened to form sharp edges, spacing projections on the bar for holding the sharp edges of the convolutions a small distance apart, means for supplying fluid and means for withdrawing same after it has passed between the convolutions of the helix, a scraper for scraping the inner surface of the helix, a spindle for the scraper, a blade wheel secured to the scraper and adapted to be rotated by the fluid flowing through the filter, a filter casing and a cover, held together by the spindle, and a mud pan supported on the spindle, the filter helix being held between the mud pan and the cover.

7. A filter for liquids and gases, such as liquid or gaseous fuel, comprising a helix consisting of a bar of substantially rectangular cross-section with one side widened to form sharp edges, spacing projections on the bar for holding the sharp edges of the convolutions a small distance apart, a spindle, a filter casing and a cover, held together by the spindle, a mud pan supported on the spindle, the filter helix being held between the mud pan and the cover, connecting branches carried by the cover for supplying fluid and for withdrawing it after it has passed between the convolutions of the helix and a safety valve on the cover, adapted to by-pass fluid from the inlet to the outlet should the filter become stopped up.

8. A filter unit comprising superposed and spaced ribbon sections, each section being of substantially rectangular cross-section with one side widened both above and below the upper and lower surfaces of the ribbon to form sharp edges, with spacing projections between adjacent sections for holding the sharp edges a small distance apart to form a filter passageway between the sharp edges.

HUGO LADERER.